June 1, 1965 R. T. ERBAN 3,186,296
METHOD AND APPARATUS FOR MICROSCOPIC INSPECTION
USING COLORED ILLUMINATION
Filed Dec. 9, 1960 2 Sheets-Sheet 1
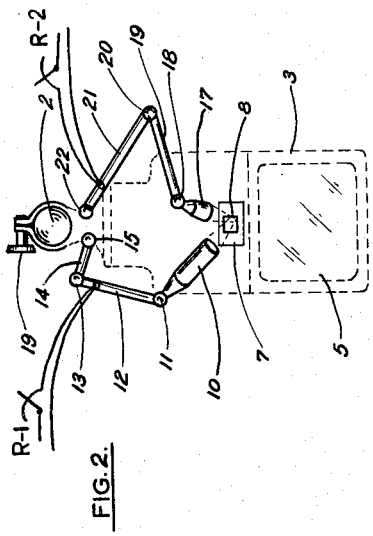
FIG. 2.
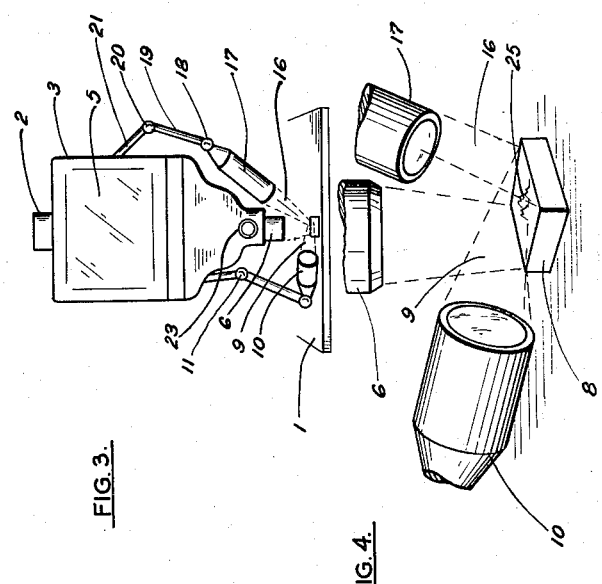
FIG. 3.
FIG. 4.
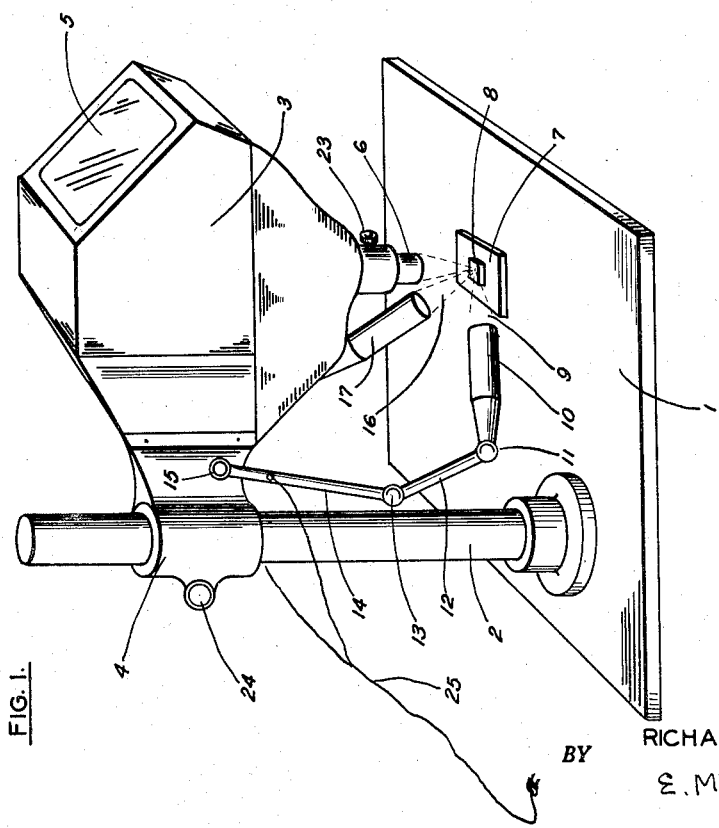
FIG. 1.
INVENTOR.
RICHARD T. ERBAN
BY
E. M. Squire
ATTORNEY June 1, 1965  R. T. ERBAN  3,186,296
METHOD AND APPARATUS FOR MICROSCOPIC INSPECTION
USING COLORED ILLUMINATION
Filed Dec. 9, 1960  2 Sheets-Sheet 2
FIG: 5.
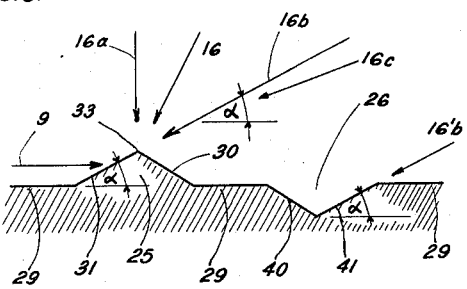
FIG: 8.
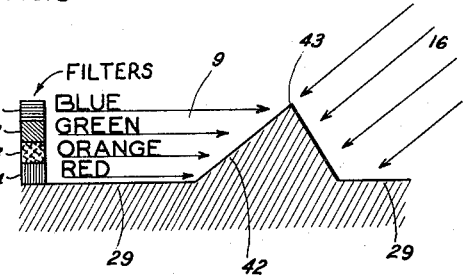
FIG: 6.
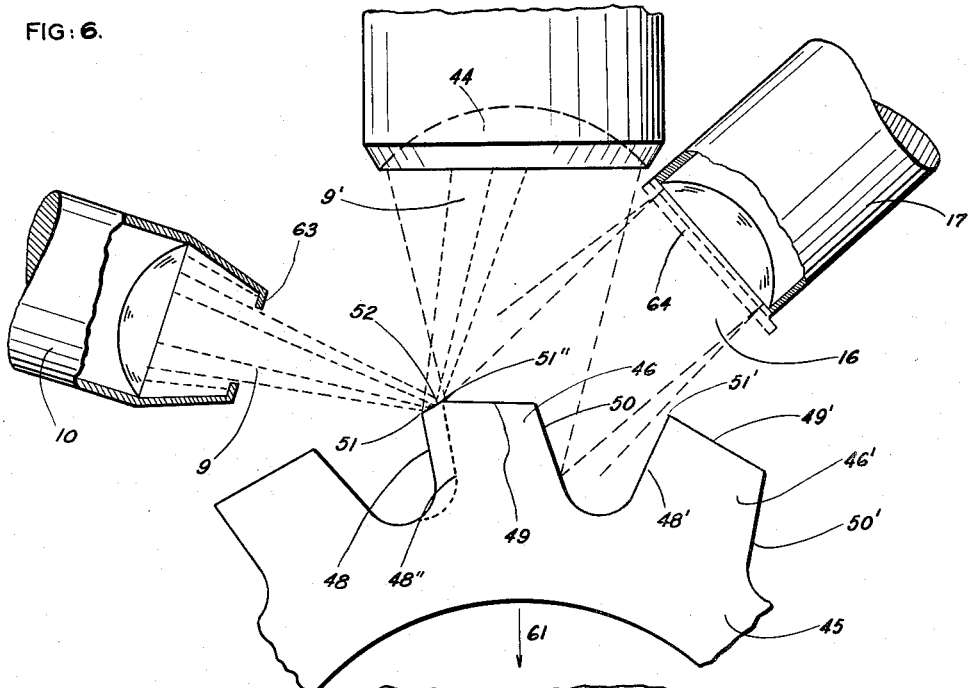
FIG: 7.
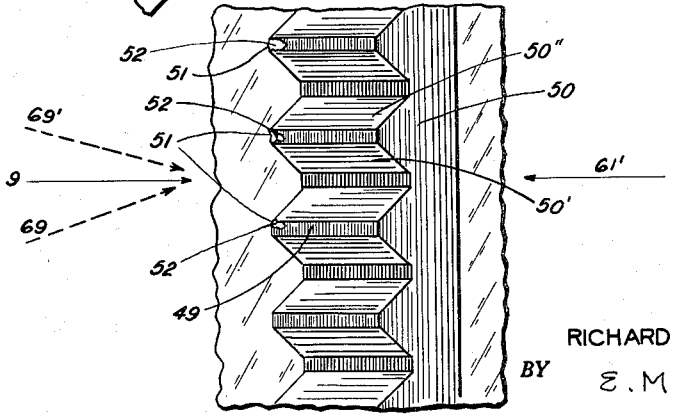
INVENTOR.
RICHARD T. ERBAN
BY E. M. Squire
ATTORNEY

United States Patent Office 3,186,296
Patented June 1, 1965

3,186,296
METHOD AND APPARATUS FOR MICROSCOPIC
INSPECTION USING COLORED ILLUMINATION
Richard T. Erban, 145—38 Bayside Ave., Flushing, N.Y.
Filed Dec. 9, 1960, Ser. No. 74,836
8 Claims. (Cl. 88—24)

The present invention relates to optical methods and apparatus for detecting small imperfections and irregularities in finished surfaces, or of small discontinuities in form or shape which, because of their extremely small size, are indiscernable to the unaided eye.

One of the aspects of this method comprises the provision of apparatus which produces a difference of illumination both as to color and intensity for different parts of the object under observation depending on small variations of position, angle, reflective properties of surfaces and spatial relation of its minute parts. The expression "differential illumination" is hereinafter used to describe such illumination. The apparatus for carrying out this method is referred to as a "differential illuminator." In its broad aspect, the invention comprises optical means for producing a plurality of light beams which may have different angles of incidence, direction and beam convergence, as well as different colors, intensities of light and different cross-section of beam. The particular combination of these differentials preferably to be used, in any case, depends upon the specific properties of the object.

In the following specification, reference is made to a projection microscope of the type described in my copending application Ser. No. 44,401, filed on July 21, 1960. While this is a preferred type of instrument, the invention may be practised using other kinds of microscopes and various other types of magnifying instruments.

The manner in which the invention may be carried out is illustrated by way of example in the accompanying drawings, in which:

FIGURE 1 is a perspective view of a microprojector for the observation of opaque objects as modified and adapted to carry out the invention.

FIGURE 2 is a schematic plan view, on a smaller scale, of the instrument shown in FIG. 1.

FIGURE 3 is a schematic front view of the same instrument.

FIGURE 4 shows an enlarged perspective view of the object being observed and illustrates the relative positions of the special instrumentation required to carry out the invention.

FIGURE 5 schematically illustrates the effect of varying angles of incidence of light upon the visibility of surface irregularities.

FIGURE 6 is a fragmentary elevational view showing a cutting tool under observation and illustrating the relative positions of the various light beams which illuminate the cutting tool.

FIGURE 7 illustrates the appearance of the object of FIG. 6 as viewed by the operator.

FIGURE 8 illustrates how illumination of the object by multiple light beams of different colors enhances the three-dimensional visual perception of the shape of the object.

Referring to FIG. 1, the projection microscope 3 is vertically adjustably supported by a bracket 4 so that its position can be adjusted to various heights by sliding movement of the bracket 4 up and down the upright column 2 by rotation of a knob 24. The base plate 1 supports a stage 7 which is adapted to hold the object 8 in any desired angular position with respect to the optical axis of the objective lens 6. A focusing knob 23 permits a fine adjustment of the lens 6, so that a sharp image of the object 8 appears upon the screen 5. FIG. 1 also shows a first illuminator 10, which produces a beam of light 9 and a second illuminator 17, which produces a beam of light 16 adjusted to illuminate the object 8 with a different angle of incidence and from a different direction than the first beam 9. The illuminators 10 and 17 respectively, are adjustably supported by the sliding bracket 4, being connected to the bracket 4 by the adjustable linkages 11, 12, 13, 14 and 15 for the illuminator 10 and similar linkages 18, 19, 20, 21 and 22 for the illuminator 17. This is best seen in FIGS. 2 and 3 where the projection microscope 3 is indicated in dotted lines to permit the supporting structure for the illuminators 10 and 17 to be clearly shown. FIG. 2 also illustrates the means for separately varying the intensity of each illuminator individually, as indicated by the rheostats R–1, R–2 respectively. The positioning of the several illuminating beams depends upon the configuration of the specific object to be observed. I have found that the acuity of visual perception of small surface details, such as imperfections, holes or protrusions, ripples, waves and even small discontinuities of curvature, is greatly increased by the use of a plurality of illuminating beams suitably adjusted as to direction, angle of incidence, intensity and color.

In the case of a substantially flat surface which is to be examined for surface irregularities such as small pit holes or small protrusions, the illuminators may be arranged in a manner illustrated in FIGS. 3 and 4 and as shown in greater detail on an enlarged scale in FIG. 5. In FIGS. 2 and 4 the first illuminator 10 is positioned to produce a beam with a large angle of incidence (as measured from a perpendicular to the surface) so that the beam is nearly parallel to the surface being examined, while the angle of incidence of the second illuminator 17 is much smaller.

In order to simplify the following description, it is assumed that the entire surface 29 of the object 8, including the partial surfaces 30–31 and 40–41 of the surface irregularities 25 and 26 respectively, have the same coefficient of reflectivity and that they obey Lambert's cosine law. The threshold of perceptibility of the surface irregularities 25 and 26 will then depend upon the difference in brightness (contrast ratio) between the very small partial surfaces 30–31 and the main surrounding surface 29, and similarly for the partial surfaces 40–41 of the depression 26. It has been found that with increasing contrast ratio, the threshold size of visual perception (i.e. the size of the smallest perceptible object measured in arc) decreases, and vice versa. By way of example, for a 100% contrast ratio and moderate general illumination, the threshold size is about 1 minute in arc of subtended angle, while for a 10% contrast ratio the threshold size is between 3 and 4 minutes of subtended arc; in other words, under conditions of high contrast ratio, the eye can perceive objects 3–4 times smaller than under conditions of a low contrast ratio of about 10%.

For surfaces which follow Lambert's law of reflectivity, i.e. where the apparent brightness changes with the cosine of the angle of incidence, we find that changes in brightness will be relatively small for angles of incidence between 0° and about 40° because of the relatively small change of the cosine of the angle (from 1.000 to 0.867). Therefore, the contrast ratio for small surface irregularities which have a dihedral angle with the main surface of up to about 40° would be rather low (under 20%) and thus increase the threshold size, or in other words, reduce the acuity of perception.

FIG. 5 illustrates these conditions by means of a small portion of a vertical section of the general surface 29 of the object 8. If the illuminating beam is positioned at 16–a, its angle of incidence is zero with respect to the general surface 29, and for the partial surfaces 30, 31 and 40, 41 the incidence angle is α, the same as the angle of inclination between the partial surfaces 30, 31 and the general surface 29. It is seen from FIG. 5 that for relatively small values of the angle α and with the illuminating beam vertical at 16–a, there will be only a low contrast ratio between the partial surfaces 30, 31 and the surrounding surface 29, because of the relatively slow rate of change of the cosine for small angles. It is further seen that when the position of the illuminating beam is changed to 16–b, in which the inclination of the light rays to the surface 29 is the same as that of the partial surfaces 30, 31, the angle of incidence for the partial surface 31 will be 90°, for the partial surface 30 it is (90−2α) and for the main flat surface 29 it is (90−α). For the cavity 26, the angle of incidence is 90° for the partial surface 41, it is (90−2α) for the partial surface 40 and again (90−α) for the main surface 29.

Referring again to the small protrusion 25, the partial surface 31 receives no light from the beam 16–b, and in the case of total absence of other extraneous light, will be completely dark. The contrast ratio against either the surface 29 or the partial surface 30 would be 100%. In practice, however, there is always some stray or ambient light impinging upon surface 31 so that the ideal 100% contrast ratio is somewhat lowered. A further difficulty arises from the fact that in most cases, it is practically impossible to find an angle of inclination for the beam 16 that will prevent the surface 31 from receiving any light and at the same time avoid formation of a shadow of the edge 33 upon the surface 29 near the base of the sloping surface 31. This shadow is formed when the inclination of the light beam to the surface 29 is smaller than the slope angle α. Yet this critical angle determines the only position which the beam 16 may take in order to avoid any of its light reaching any portion of the partial surface 31 in all cases where this small surface 31 is not perfectly plane and flat. It is also seen that if the beam 16 is not perfectly collimated, that is, if it consists of either convergent or divergent rays, a portion of these non-parallel rays must cast a shadow of the crest 33 upon the surface 29. This dark portion of surface 29 at the very edge of the partial surface 31 appears like an extension of the area of 31 and makes a clear recognition of the size and shape of surface 31 rather difficult, thereby causing mistakes in measurements.

I have found that this difficulty is eliminated according to the invention by introducing a second system of illuminating light rays which impinge upon the object with different angles of incidence from a different direction. The second system also differs from the first illuminating system with respect to color or combination of colors of light as well as to other characteristics of the beam including angular convergence or divergence of the beam degree of dispersal or scattering of light, linear aperture or beam cross-section, and in some cases, orientation of the plane of polarization.

Referring again to FIG. 5, a second beam of illumination 9 is shown in a position where it forms a very small angle with the surface 29 and preferably this beam has a very small angle of convergence of its rays. It has a color substantially different from that of beam 16. The most effective combination of colors depends upon the color characteristics of the object being viewed, and in many cases, good results are obtained with one of the two beams being a white light. By way of example, the beam 16–c in FIG. 5 may be white and the beam 9 may be red. Inspection of FIG. 5 will show that the surface 29 will receive no red light if all rays 9 are parallel to surface 29, and it will receive only a very small amount of red light if the beam, or some of its rays, form an angle of a few degrees with the surface 29; the partial surface 31 will receive, depending on the magnitude of the angle α, an amount of illumination from beam 9, which if it were white would substantially reduce the contrast ratio between 31 and 29; but since the beam 9 is of a red color, the partial surface 31 now appears (seen from the lens position directly above, as in FIG. 4) as a small red area which is delimited from its surroundings by a clear, sharp boundary line. If the colors of the two beams are interchanged so that 9 is white and 16–c is red, the partial surface 31 will appear as a white area upon a red background.

It has been found that the boundary line between two adjacent areas having different colors is clearly perceptible even at equal brightness of the two adjacent areas, equal brightness being a condition where no boundary line could be perceived when both areas are illuminated with the light of the same kind and color. I have found that that use of a plurality of light beams, providing a color difference, increases the acuity of perception to such a degree that small details become visible under conditions where no visibility exists when light of the same color is used.

FIGS. 6 and 7 illustrate the application of this new method to the inspection and measurement of damage to the cutting edges of a cutter. As shown in the drawing, a gear cutting tool, such as a gear hob is under inspection. FIG. 6 shows a fragmentary section perpendicular to the rotational axis of the hob 45, with a particular tooth, 46 positioned for inspection through the objective lens 44 of the microscope.

The hob, as shown in FIG. 6, is arranged for cutting when rotating counterclockwise, that is, the edge to the left of each tooth is the cutting edge. Thus, for the tooth 46' the intersection of the back 49' and the left flank 48' form the cutting edge. For the tooth 46, the formerly sharp cutting edge 51 has been worn down to a position 52, which is an edge of the flank 48, but which is no longer the left hand edge of the back face 49. In the originally sharp edge, a little area 52 has appeared which is inclined to both 48 and 49 and which in most cases is neither flat nor perfectly smooth. Also, its surface characteristic is usually one of predominant specular reflection with one preferred direction.

In order to restore the cutter to useful service, the tooth 46 must be ground so that the flank 48 is moved back to the position 48″ where it again forms a sharp intersection line (cutting edge) 51″. A similar amount must then be ground off each of the other teeth, whether damaged or not, in order to have uniform depth of cut and profile for all teeth. This grinding operation involves a considerable amount of expense for labor and shortens the useful life of the cutter by an amount which is determined by the volume of metal ground off. The actual life of the cutter is determined by how many times it can be sharpened before the teeth become too weak to withstand the cutting force impact at its edge without breaking. Since gear hobs are expensive, there is great importance in ascertaining accurately the least amount of metal that must be ground off to restore the cutter to a serviceable condition. This is accomplished by the new method and apparatus herein described.

FIG. 6 illustrates a preferred position for the two illuminators 10 and 17 respectively. The beam 16 illuminates the right flank 50 and the back face 49 of the tooth 46 and is arranged at such an angle that the dull spot or worn area 52 receives very little light from this beam.

The illuminator 10 which produces a narrow beam 9 is so arranged that its light is concentrated in the general area of the dull cutting edge of the tooth 46 and at such an angle that the main portion of its light reaches the objective lens 44 by specular reflection. The worn spot 52, or at least its boundaries if it is more than a tiny spot, are usually of a high specular reflective character, particularly in the direction of motion of the cutter circumference, that is for light substantially in or near a plane at right angles to the cutter axis. The back face 49 of the cutter tooth, the surface of which bears fine grinding marks, has in general the reflecting characteristics of a coarsely wire brushed surface with a high degree of light scattering. The direction of the beam 16 therefore is preferably at an angle to the plane of rotation of the cutter, or between the directions of the arrows 61 and 61' as indicated in FIG. 7. The direction of the beam 9' is preferably between the directions of the arrows 69 and 69'.

If we provide the illuminator 17 with a filter 64 to produce a beam of red light and the illuminator 10 with suitable aperture limiting means 63 arranged to permit adjusting the beam 9 to a narrow white pencil of light, the objective lens 44 will make visible an image such as illustrated in FIG. 7 which has been drawn as actually observed when using the instrument. It shows four cutter teeth and the boundaries of the damaged cutting edges of three teeth have been drawn as closely as possible to reproduce the visible image. With the red beam 16 illuminating the cutter in general and the white beam 9 adjusted upon the cutting edges as shown, the worn spots appear as silver white small areas upon a slightly darker red background. The impression, which cannot be fully communicated either by description or by a black and white drawing, is that the cutter has been painted a vivid red with the exception of the worn areas which are silvery white. Even a slightly dulled cutting edge will show up as a fine silvery line upon a red ground and thus become easily visible. The precise size of the worn areas 52 can be accurately measured by known means such as scales or templates if the image is projected upon a screen of the kind illustrated in FIG. 1, or by ocular micrometer scales if the microscope provides for direct viewing by eye pieces. If the colors of the two illuminating beams are interchanged, the cutter itself appears white and the worn spots appear as if marked by red paint. Under certain conditions of surface finish of the general surfaces, it may be preferable to supplement the general illumination from the single beam 16 by one or more additional beams, or to use light which is scattered or diffused to a suitable degree by inserting a diffusing filter in the beam 16. This is particularly advantageous in cases where specular reflections from the light of the beam 16 must be avoided.

A further example of the use of multiple light beams of different characteristics, notably color, is illustrated in FIG. 8. It illustrates a cross-section through a surface 29 and a part 42 protruding therefrom. There is a general illumination by a beam 16 from the right side and a special striated horizontal illumination from the left side by the beam 9 which is a composite beam comprising several beams of different colors, as indicated. Such a beam may be produced by a combination of filters 71, 72, 73 and 74 producing superposed striations of different colors, or, if the arrangement of colors is that of the rainbow, it may be produced by suitable refraction of a white beam. It is so arranged that the vertical distance from a striation of one color to the next striation, or the thickness of each layer or striation of any specific color, is accurately predetermined in the zone where the composite beam strikes the target 43. If several targets of different heights are seen simultaneously, this type of calibrated illumination will clearly distinguish each target according to its height and thus provide a perception of depth, or third dimension, which is absent for illumination by a single beam of uniform color characteristic. This method of multiple multicolored beam illumination may also be used to measure the height of small surface irregularities which it would be very difficult to measure directly by the difference of focusing between the top and for the bottom of the protrusion.

While I have shown what I believed to be the best embodiments of my invention, it will be apparent to those skilled in the art that various changes may be made therein without departing from the spirit and scope of the invention as defined in the appended claims.

What is claimed is:

1. The method of increasing the acuity of visual perception of minute irregularities in the surface of an object under microscopic observation which comprises the steps of holding the object suitably positioned with respect to the objective lens of a microscope, illuminating said object simultaneously by a plurality of light beams of differing colors and intensities, and adjusting the angle of incidence of each individual light beam upon the object to achieve a differential illumination of the portions of the surface of said object which are under observation.

2. An optical device for increasing the acuity of visual perception of minute details of an object, said device comprising a magnifier for making visible to an observer an enlarged image of said object, a plurality of optical illuminators constructed to project separate individual illuminating light beams upon said object, separate means to vary the intensity of each light beam, means to cause the color of a particular light beam to differ from the color of another light beam, and separate means for imparting a predetermined angle of incidence of each of said individual beams upon said object.

3. The method of microscopic examination of an object which comprises the steps of illuminating said object with light of a first characteristic, simultaneously and separately illuminating said object with light of a second characteristic from a direction different from the direction of said light of said first characteristic, said second characteristic including a color difference with respect to said first characteristic, and microscopically examining said object while so illuminated.

4. The method of microscopic examination of an object, which comprises the steps of illuminating said object generally from one direction with light from a first source, simultaneously and separately illuminating a restricted portion of said object from a second direction with light from a second source, said second direction making a substantial angle with said first direction, said sources producing light of different colors, and microscopically examining said object while so illuminated.

5. The method according to claim 4, comprising the further step of forming the light from one of said sources into spaced parallel striations of different color characteristics, the spacing among the several striations being accurately predetermined.

6. The method according to claim 4, wherein said striations extend substantially parallel to that portion of the surface of said object which is under examination.

7. Optical apparatus of the class described, comprising supporting means for holding an object to be examined, microscope means positioned for observation of said object when held by said supporting means, a first illuminator for directing light upon said object, a second illuminator for separately directing light on said object simultaneously with said first illuminator and independently thereof, means for independently adjusting the relative directions of light directed on said object by said illuminators, means for separately adjusting the relative intensities of the light directed on said object by said illuminators, and means for imparting to the light directed on said object by one of said illuminators a color which differs markedly from the color of the light directed on said object by the other illuminator.

8. Apparatus according to claim 7, wherein said means for imparting color includes means for forming the light directed on said object by said one illuminator into a series of striations each having a color characteristic which is different from the color characteristic of an adjacent striation.

References Cited by the Examiner
UNITED STATES PATENTS

| | | | |
|---|---|---|---|
| 774,549 | 11/04 | Baese | 88—24 |
| 1,682,163 | 8/28 | Alder | 88—24 |
| 1,973,066 | 9/34 | Hauser et al. | 88—40 |
| 2,151,817 | 3/39 | Wenschow | 88—24 |
| 2,349,457 | 5/44 | Osterberg et al. | 88—40 |
| 2,730,923 | 1/56 | Gorham et al. | 88—40 |
| 2,746,348 | 5/56 | Leitz | 88—40 |

FOREIGN PATENTS 498,377  1/39  Great Britain.

OTHER REFERENCES

"Instruments" vol. 23, page 44, January 1950.

Wolfe, K. J. B.: Photomicrography in Color by Reflected Light. In Photographic Journal (British), vol. 91 B, pages 94–96, Sept.–Oct. 1951.

NORTON ANSHER, Primary Examiner.

WILLIAM MISIEK, EMIL G. ANDERSON, Examiners.